US008504344B2

(12) United States Patent
Hall (10) Patent No.: US 8,504,344 B2
(45) Date of Patent: Aug. 6, 2013

(54) INTERFACE BETWEEN A VERIFICATION ENVIRONMENT AND A HARDWARE ACCELERATION ENGINE

(75) Inventor: Giles T Hall, Evesham (GB)

(73) Assignee: Cadence Design Systems, Inc., San Jose, CA (US)

( * ) Notice: Subject to any disclaimer, the term of this patent is extended or adjusted under 35 U.S.C. 154(b) by 820 days.

(21) Appl. No.: 12/242,491

(22) Filed: Sep. 30, 2008

(65) Prior Publication Data

US 2010/0082315 A1 Apr. 1, 2010

(51) Int. Cl.
*G06F 11/261* (2006.01)
*G06F 17/50* (2006.01)

(52) U.S. Cl.
USPC ......... 703/13; 703/2; 703/14; 703/23; 703/28

(58) Field of Classification Search
USPC ................ 703/13, 27, 2, 14, 23, 28; 716/4, 716/5, 17; 714/739
See application file for complete search history.

(56) References Cited

U.S. PATENT DOCUMENTS

| | | | |
|---|---|---|---|
| 4,802,091 A | 1/1989 | Cocke et al. | |
| 5,325,533 A | 6/1994 | Mcinerney et al. | |
| 5,452,457 A | 9/1995 | Alpert et al. | |
| 5,530,964 A | 6/1996 | Alpert et al. | |
| 5,655,073 A | 8/1997 | Nishikado et al. | |
| 5,774,726 A | 6/1998 | Ahmed | |
| 5,838,948 A * | 11/1998 | Bunza | 703/27 |
| 6,029,262 A | 2/2000 | Medd et al. | |
| 6,038,378 A | 3/2000 | Kita et al. | |
| 6,161,217 A | 12/2000 | Detlefs et al. | |
| 6,182,258 B1 * | 1/2001 | Hollander | 714/739 |
| 6,272,451 B1 | 8/2001 | Mason et al. | |
| 6,321,376 B1 | 11/2001 | Willis et al. | |
| 6,347,388 B1 * | 2/2002 | Hollander | 714/739 |
| 6,389,379 B1 | 5/2002 | Lin et al. | |
| 6,550,057 B1 | 4/2003 | Bowman-Amuah | |
| 6,571,373 B1 | 5/2003 | Devins et al. | |
| 6,701,490 B1 | 3/2004 | Talukdar et al. | |
| 6,842,883 B2 | 1/2005 | Whitehill | |
| 7,000,224 B1 | 2/2006 | Osborne et al. | |
| 7,051,303 B1 | 5/2006 | Lam et al. | |
| 7,366,652 B2 * | 4/2008 | Wang et al. | 703/28 |
| 7,424,416 B1 * | 9/2008 | Cavanagh et al. | 703/13 |
| 7,480,609 B1 * | 1/2009 | Cavanagh et al. | 703/23 |
| 7,657,877 B2 | 2/2010 | Vorbach et al. | |

(Continued)

OTHER PUBLICATIONS

Andrews, J., Coverage Driven Methodology for Verification of SoC Hardware and Software Corner Cases, 2006.

(Continued)

*Primary Examiner* — Thai Phan
(74) *Attorney, Agent, or Firm* — Vista IP Law Group, LLP (57) ABSTRACT

The present invention allows a verification environment to be used to control and coordinate interaction with a design running on an accelerator or emulator without significant speed penalty. For example, an interface capable of communicating with test software running on an embedded processor is used to control and monitor the flow of data into the external interface of the design. Thus, a connection is made between the verification environment and the design under test running on the accelerator/emulator via a connection formed directly between the verification environment and embedded software running on the emulator for simulation and monitoring purpose at a very low frequency so that high-speed acceleration may still be achieved.

24 Claims, 7 Drawing Sheets

U.S. PATENT DOCUMENTS

| | | | |
|---|---|---|---|
| 7,681,184 | B1 | 3/2010 | Weedon et al. |
| 7,689,973 | B2 | 3/2010 | Kwong et al. |
| 7,702,958 | B2 | 4/2010 | Kwong et al. |
| 7,810,081 | B2 | 10/2010 | Dickenson et al. |
| 2002/0073375 | A1* | 6/2002 | Hollander .................... 714/739 |
| 2002/0120909 | A1 | 8/2002 | Brouhard et al. |
| 2004/0216023 | A1 | 10/2004 | Maoz et al. |
| 2004/0243984 | A1 | 12/2004 | Vorbach et al. |
| 2005/0039079 | A1* | 2/2005 | Higashi et al. .................. 714/28 |
| 2005/0165597 | A1* | 7/2005 | Nightingale .................... 703/27 |
| 2005/0246693 | A1 | 11/2005 | Plum |
| 2006/0015313 | A1* | 1/2006 | Wang et al. ..................... 703/14 |
| 2007/0277130 | A1* | 11/2007 | Lavelle ............................. 716/4 |
| 2008/0016396 | A1* | 1/2008 | Higashi et al. .................. 714/30 |
| 2008/0215768 | A1 | 9/2008 | Reid et al. |
| 2008/0271001 | A1 | 10/2008 | Nonomura et al. |
| 2009/0125882 | A1 | 5/2009 | Frigo et al. |
| 2009/0287468 | A1* | 11/2009 | Lin et al. ......................... 703/28 |

OTHER PUBLICATIONS

Halls, G., Hardware Software co-verification using Coverage Driven Verification Techniques, 2005.

Zwingenberger, E., Extending a coverage driven verification environment with real software, Micronas, CDNLive! EMEA, Nice, France, Jun. 25-27, 2006.

Andrews, J., Co-Verification of Hardware and Software for ARM SoC Design, Aug. 30, 2004, Newnes, pp. 1-288.

Hanford, K. V., Automatic generation of test cases, IBM Systems Journal, 1970, vol. 9, Issue 4, pp. 242-257.

Esin, A., et al., Experiments on Semantics Based Testing of a Compiler, 2008.

Zelenov, S., et al., Test Generation for Compilers and Other Formal Text Processors, Programming and Computer Software, vol. 29, No. 2, Nov. 19, 2003.

Final Office Action dated Jan. 17, 2012 for U.S. Appl. No. 11/949,553.

Winterholer, M., Transaction-based Hardware Software Co-verification, FDL'06 (Sep. 2006).

Notice of Allowance dated Dec. 29, 2011 for U.S. Appl. No. 11/966,834.

Yoshikawa, T., Random Program Generator for Java JIT Compiler Test System, Nov. 6, 2003.

Gupta, G., Automatic Generation of Provably Correct Parallelizing Compiliers, Aug. 10, 1998.

Saini, et al., Co-Verification Methodology for Platform FPGAs, Feb. 22, 2005, EE Journal.

Non-Final Office Action dated May 20, 2011 for U.S. Appl. No. 11/949,553.

Non-Final Office Action dated Jun. 2, 2011 for U.S. Appl. No. 11/966,834.

* cited by examiner

INTERFACE BETWEEN A VERIFICATION ENVIRONMENT AND A HARDWARE ACCELERATION ENGINE

FIELD OF THE INVENTION

The invention relates to Integrated Circuit (chip) design.

BACKGROUND

To ensure the proper function of a chip design, the chip or a system with the chip may be simulated in its real environment. Verification environment may also be coupled with the simulation in order to verify the chip.

Coverage Driven Verification (CDV) is a well-recognized and successful technique for dynamic verification of hardware design. The CDV environment runs on a connected workstation. The workstation may be coupled to an emulator which emulates a design under test (DUT). It is desirable to perform the testing as fast as possible. Thus, the emulation of the DUT may be accelerated.

One problem associated with the CDV is that the complex generation, coverage and checking algorithms may not generally be accelerated alongside the design when the design is mapped to an emulator where the design under test is being accelerated. As a result, the emulation has to be executed at a speed slower than what is possible. This configuration leads to significantly reduced performance improvement from the emulator.

The performance is reduced because verification is performed on a general-purpose processor that frequently communicates with the design and involves a lot of computation. In addition, the emulator simulates at a faster speed when compared to the verification processes. In other words, the clock cycle required for the simulation takes less time than the processing involved for verification. As a result, the emulator has to wait in order for the verification processes to catch up.

In general, running verification environments on the emulator becomes more difficult in complex environments. The emulation environment uses specially-designed components to drive interfaces and then control these components from software running in an accelerated microprocessor. Testing in this manner is faster but does not benefit from the advantages of cover driven verification (CDV). CDV requires very complex algorithms to generate and monitor verification data, and these algorithms are generally impossible to accelerate. In order to get the advantages of increased speed, verification complexity has to be sacrificed.

A conventional approach uses transaction-based interfaces between the CDV environment and the design under test (DUT) running on the emulator. This approach reduces the quantity of traffic between the CDV environment and the emulator. This approach also potentially reduce the amount of traffic, which may improves the speed of the emulation. However, this approach still places a limit on the amount of data that can be communicated through the transaction-based interface. Thus, this approach is limited by the availability of specially-designed verification components that have the necessary transaction-based interface, as well as speed optimizations in the generation, coverage and checking components.

SUMMARY

The present invention presents an interface between a verification environment and a hardware acceleration engine. The advantages include simulating and monitoring at a lower frequency so that high-speed acceleration of the emulator may be achieved.

In one embodiment, the interface is capable of communicating with test software running on an embedded processor of the emulator to control and monitor the flow of data into the external interface of the design. A register transfer level (RTL) verification is built surrounding the design under test (DUT). This environment may include low level bus functional modules (BFM's) to communicate with one or more of the DUT's external interfaces. Each of these BFM's have a DUT side interface connecting to the DUT and a test side interface that connects to a local processor bus. This interface may be part of a dedicated I/O connection.

In another embodiment, a processor is instantiated in the test environment and connected to the BFM's and the processor subsystems such as memory. In other embodiments, the DUT's own processor may be used with an internal DUT bus connected to these BFM's instead of having the dedicated test processor.

In another embodiment, simple software routines are written to run on the embedded processor to configure the BFM's and the DUT. Data are sent and received through the BFM's to the DUT. The data to be sent may be pre-generated and stored in memory of the emulator, placed on the processor bus and then selected by the test software routines.

In another embodiment, the user may use an interface to the test software routines to allow the calling and coordinating of activities in the design from the verification environment. In one embodiment, the verification environment runs on a work station. In another embodiment, the verification environment is not included in the design under test (DUT) and does not run on an emulation engine. The user may also connect a general purpose input/output (GPIO) to call back functions through the interface and to pass monitoring data back to the verification environment.

DETAILED DESCRIPTION

In some embodiments, the present invention includes an approach of using embedded software to control the accelerated test environment with an interface to allow a more complex, verification environment, such as a CDV environment, to control the embedded software from a connected workstation. This arrangement brings verification back under the control of a complex verification mechanism. An advantage of this embodiment is to reduce data traffic and to allow more complexity by splitting the verification environment so that high speed sections are provided to the acceleration engine while lower frequency, more complex elements stay on the workstation. The acceleration engine may increase the speed of the emulation of the DUT. The acceleration engine running with an emulator may function as an accelerator. Other accelerators known to one skilled in the art may also be used in the emulator environment.

Figure 1:
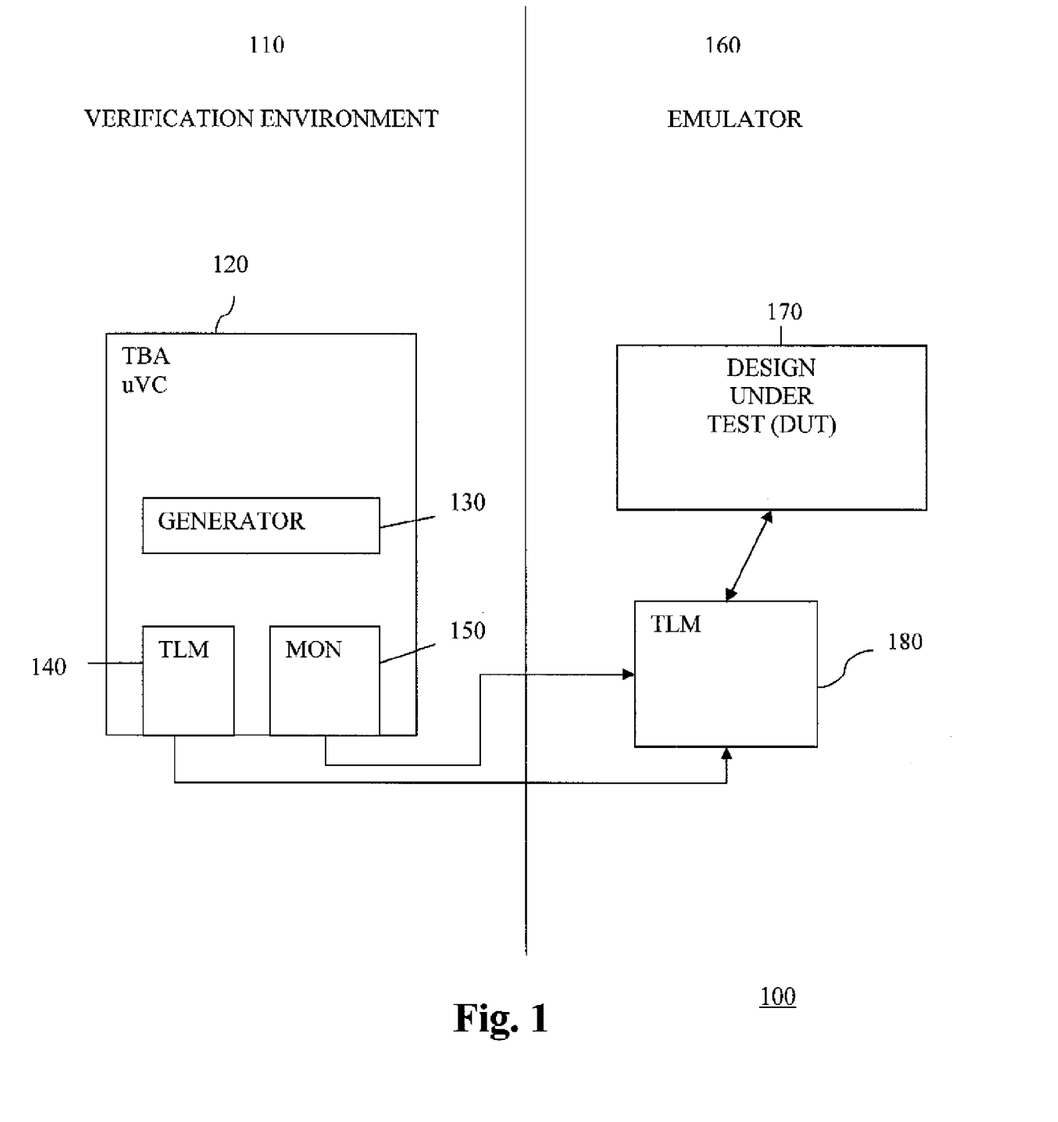
FIG. 1 illustrates a diagram of a communication between a verification environment and an emulator according to an embodiment of the invention.

FIG. 1 illustrates a diagram of an approach for implementing a communication strategy between a verification environment of a workstation and an emulator environment coupled to the workstation having a design under test (DUT). The verification system 100 includes a verification environment 110 and an emulator 160. The verification environment 110 includes a transaction based acceleration (TBA) universal verification component (uVC) 120 having a generator 130 for generating testing data for the DUT, transaction level model (TLM) 140 for providing the data in the proper format, and a monitor 150 for monitoring the progress of the testing. The emulator portion 160 includes the DUT 170 and a TLM 180 which allows for communication with the verification environment.

For example, the TBA uVC 120 may be a component within the workstation. The generator 130 of the TBA uVC 120 generates verification data and algorithms for testing the DUT. A protocol and/or format may be applied to verification data and algorithms in order to communicate with the emulator. TLM 140 and TLM 180 are designed to provide transmission of the verification data and algorithms in the proper format or protocol at a transaction level in order to allow communication between the verification environment and of the emulator. The TLM may be any number of format as desired by the tester. The TLM 140 is designed to be compatible with a corresponding TLM 180 that recognizes the protocol of the signal being sent. The monitor 150 may monitor the communication that is received at the emulator.

Figure 2:
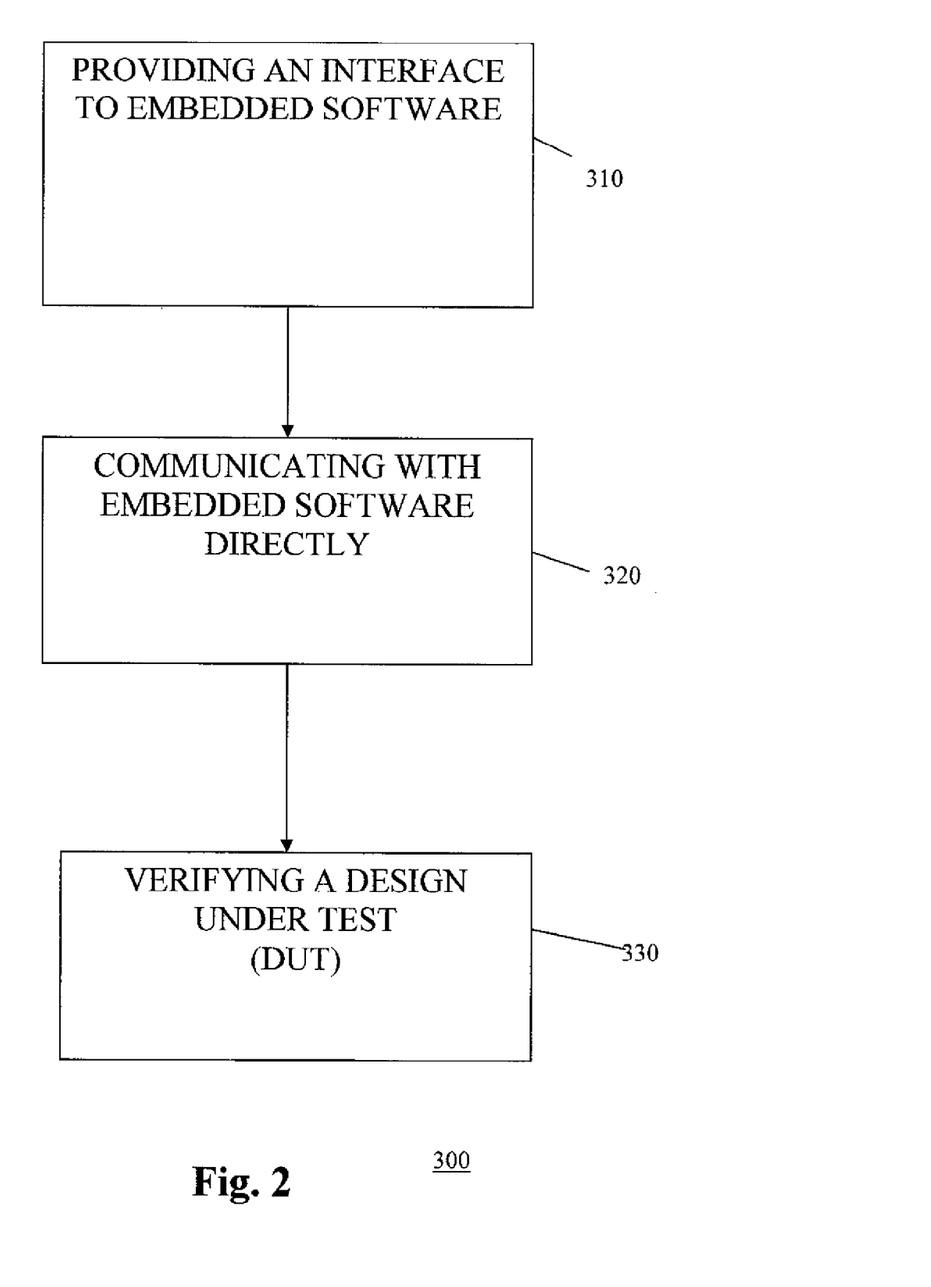
FIG. 2 depicts a flow diagram of a process for accelerating an emulator via an interface between a verification environment and a hardware acceleration engine according to a embodiment of the invention.

FIG. 2 depicts a flow diagram of a process for accelerating an emulator via an interface between a verification environment and a hardware acceleration engine according to an embodiment of the invention. In some embodiments, a DUT may be verified without requiring complex processing being performed in the verification environment. Most of the verification test generation and processing are being performed in the emulator. In one embodiment, the CPU is a dedicated CPU. In another embodiment, CPU is located in the DUT. The CPU may be located and shared in any combination in the emulator. In other embodiments, the CPU may be instantiated within the emulator, such that the embedded software or other portions of the emulator may be configured to function as the CPU.

In one embodiment, an interface is provided to an embedded software (310). The interface allows the verification environment to keep control of the verification testing while reducing the amount of processing the data transmission performed by the verification environment. The interface may be coupled to a monitor, which allows the uVC to monitor data points of functional design activities in the DUT within the emulator during verification testing. In another embodiment, the interface does not monitor design changes.

The interface communicates directly with the embedded software of the emulator (320). In some embodiments, the interface may use a dedicated I/O data port and connection to access a "backdoor" to be able to communicate with the memory in the DUT. In other embodiments, it also is able to directly monitor the verification tests. In further embodiments, it is able to call any subsystems coupled to the emulator's environment.

In 330, verification of the DUT is performed using stimuli communicated directly by the interface. The stimuli may be simple commands that allow the embedded software or other portions of the emulator to generate verification data and testing programs for the DUT. The interface provides a conduit for directly communicating with the embedded software and not the design of the DUT. In some embodiments, the DUT receives the verification tests from the embedded software. Using the generated data and/or programs, verification of the DUT may be performed.

Figure 3:
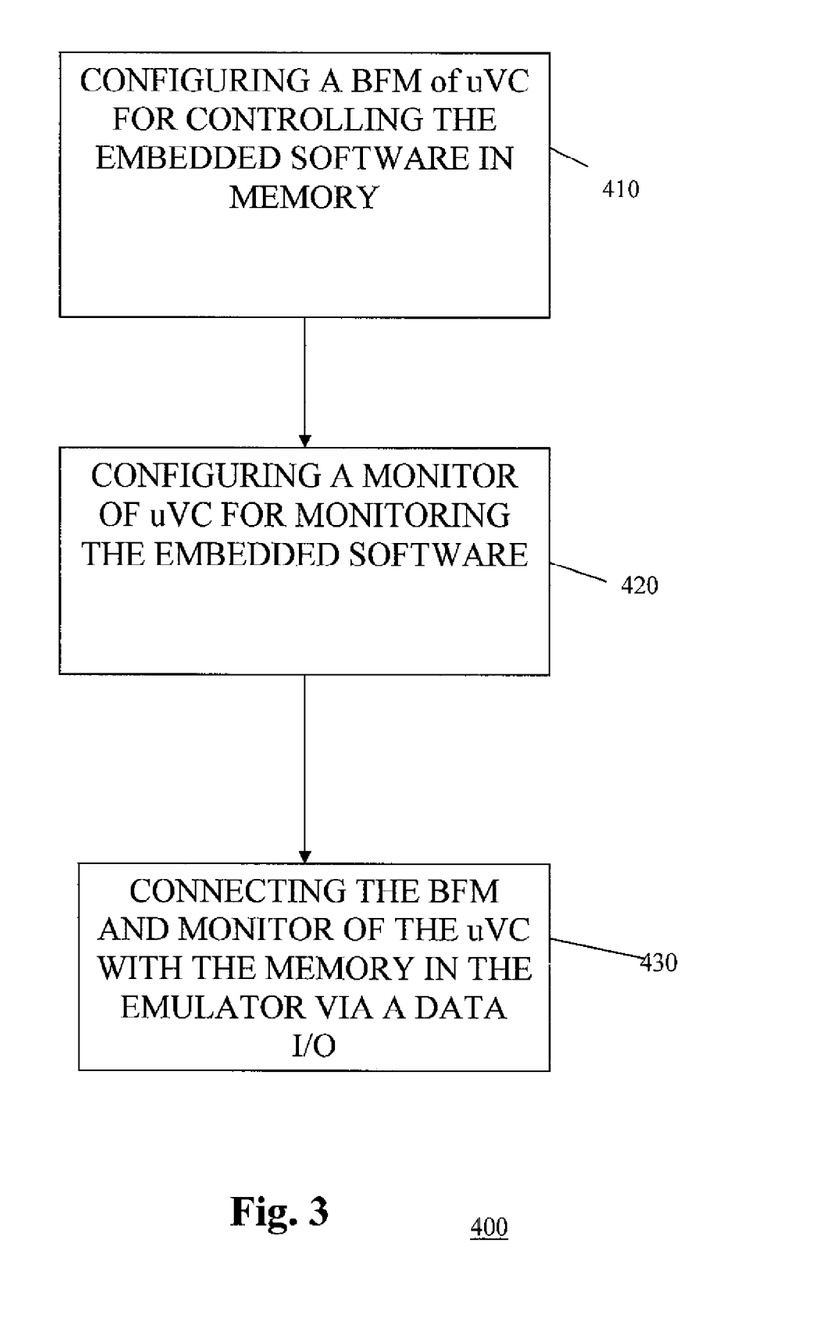
FIG. 3 depicts a flow diagram of a process for providing an interface according to an embodiment of the invention.

FIG. 3 depicts a flow diagram of a process for providing an interface according to an embodiment of the invention. The interface is provided for the embedded software of the emulator. In one embodiment, 310 of FIG. 2 may be implemented using the process of FIG. 3.

The interface may include the bus functional model (BFM) component as part of uVC for controlling the embedded software (410) directly. The BFM is configured with the desired protocol and format in order to transmit the data (i.e., stimuli) to the embedded software that is understandable by the embedded software. The protocol and format may be of USB, Ethernet, etc. The desired protocol and format is based on what one of skilled in the art deems desirable and proper. The BFM of the interface allows for direct function calls inside the embedded software from the verification environment. In one embodiment, the function calls are performed by the uVC. In other embodiments, other portions of the verification environment may perform the function calls. The interface allows the uVC to control the timing, tests, etc. of the emulator in the verification environment and let the emulator perform the heavy processing and high frequency or occurrences of test generation, verification processing, etc. that is costly with respect to bandwidth and CPU usage.

The interface may include a monitor as part of an uVC for monitoring the subsystems via embedded software (420). The monitor is configured to recognize the signals and protocols provided by the embedded software in order to observe any desired information of the DUT. In some embodiments, interrupts may be observed and recorded for future analysis.

After the BFM and monitor are configured, they are connected to the emulator via a dedicated data I/O (430). The data I/O port may act as a "backdoor" to the emulator. The data I/O provides the required pathway for the uVC to transmit and monitor directly to the embedded software without transmitting to the BFM's or TLM's of the emulator. In some embodiments, interrupts that occur during the verification tests are monitored via the data I/O, and this information may assist the further verification of the design.

Figure 4:
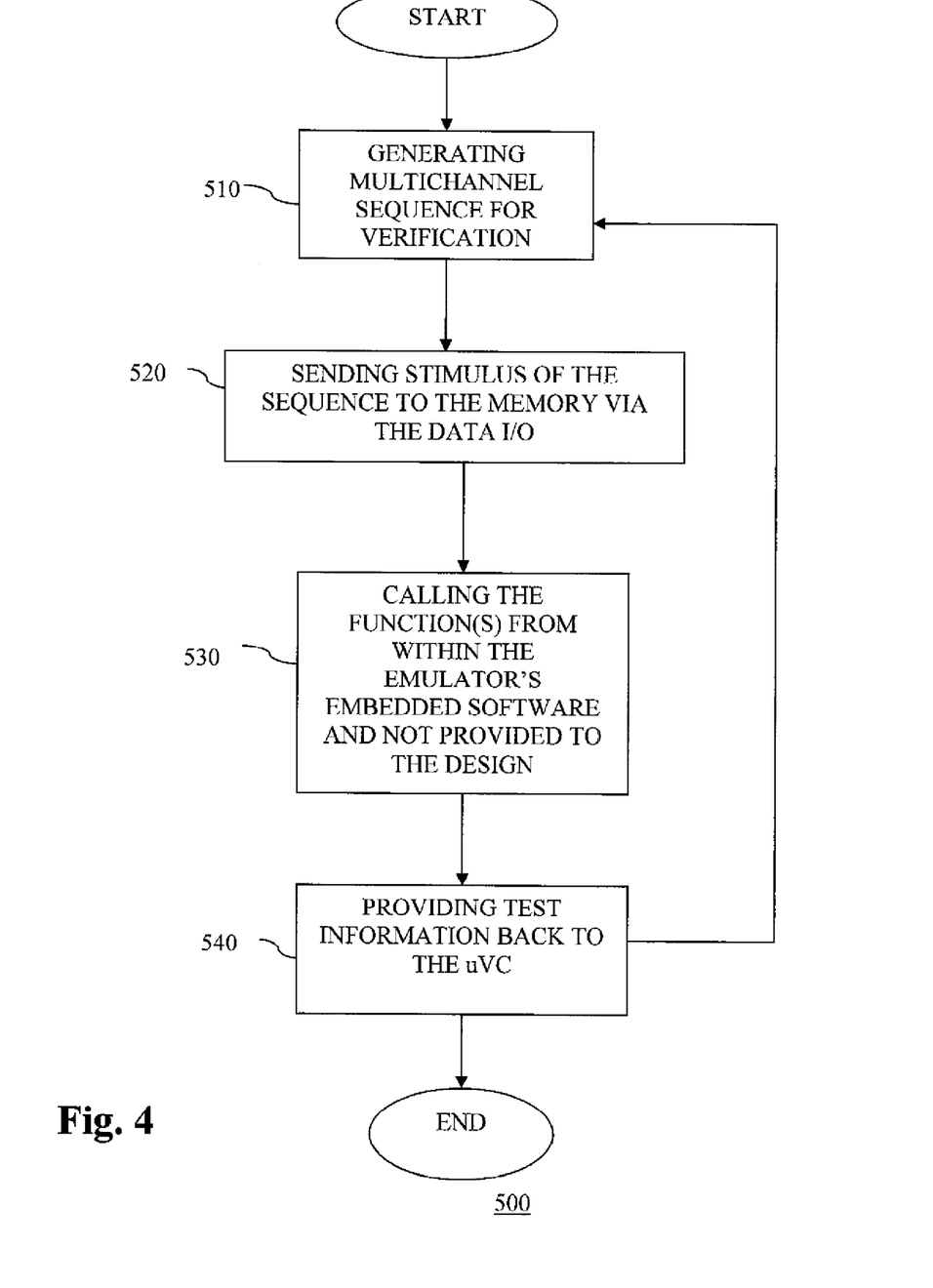
FIG. 4 depicts a flow diagram of a process for directly communicating with the embedded software according to an embodiment of the invention.

After the direct interface and its components are configured and connected, direct interfacing and communication may occur as depicted in FIG. 4 of the flow diagram 500. In one embodiment, 320 of FIG. 2 may be implemented using the process of FIG. 4.

Multiple unification interfaces may be simultaneously controlled. In one embodiment, a multi-channel sequence for verification is generated (510). This generation may be generated in the uVC. In other embodiments, this generation may occur in other components in the verification environment. The sequence may include a plurality of stimuli for generating verification tests within the emulator. These stimuli are low frequency when compared to the communication of the verification tests between BFM's of the verification environment and the emulator.

After the sequence is generated, the stimuli of the sequence are sent to the embedded software via the dedicated data I/O (520). In some embodiments, stimuli include information for the embedded software to generate verification tests in the compatible protocol formatting and to provide to the peripheral BFM where verification testing may occur for the DUT. In other embodiments, other type of information, such as video frames or test signal information, may be sent to the embedded software to assist in the generation of verification tests. Any type of information may be used as stimuli in order to facilitate the generation of verification test at the embedded software.

When the embedded software receives the stimuli, the embedded software utilizing the resources within the emulator will perform the necessary processes to generate the verification tests. In 530, the function calls are called from the embedded software and not provided to the DUT. In other embodiments, the function calls will utilize dedicated processors in the emulator to generate verification tests. In other embodiments, the function calls utilize processors within the DUT to assist in generating the verification tests. Other function calls may be performed. Because the function calls and processing are performed in the emulator, all communications between the function calls and processing occur within the emulator. Therefore, the bandwidth required for communications between the verification environment and the emulator is reduced.

In 540, during verification testing of the DUT, information regarding the verification tests is recorded and provided back to the uVC via the data I/O for monitoring by the uVC. This information may include interrupts, functional coverage, functional checks and error information. This information may be used to gain a better understanding of the DUT and may be used to improve the design.

Figure 5:
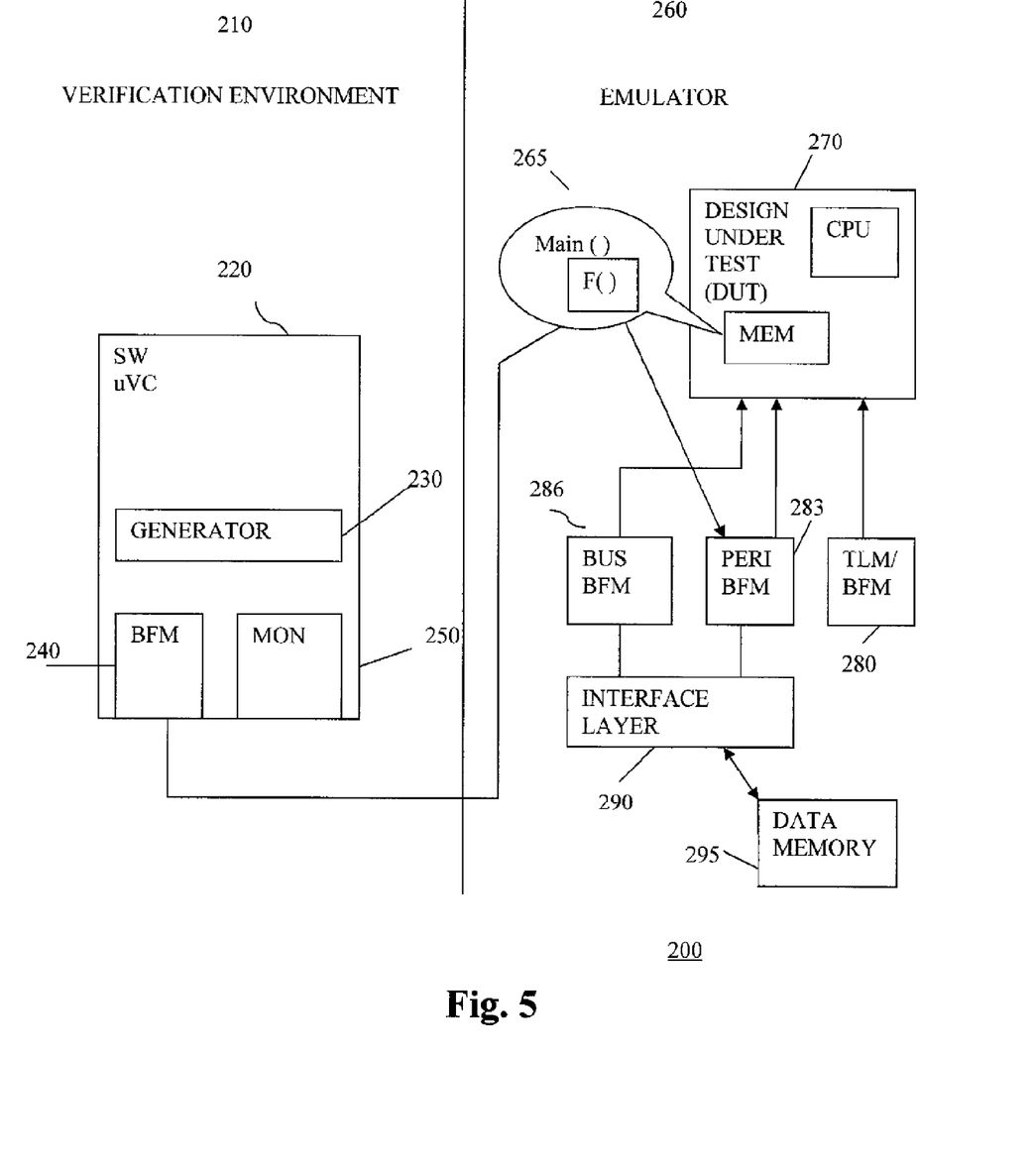
FIG. 5 illustrates a diagram of a communication between a verification environment and an emulator according to another embodiment of the invention.

FIG. 5 shows an illustrated embodiment of a diagram of a communication strategy 200 between a verification environment 210 and an emulator 260. The verification environment 210 includes a software (SW) universal verification component (uVC) 220 having a generator 230 for generating the stimuli, BFM 240, and a monitor 250. The emulator portion 260 includes a design under test (DUT) 270, Bus BFM, peripheral BFM 283 and a TLM/BFM 280. The DUT 270 includes verification algorithms 265, a CPU, memory and processors.

In one embodiment, the verification environment is located on a host workstation, and the design and test bench is running on the emulator. In other embodiments, the verification environment may be located on a host remote to the DUT. In general the verification environment and the emulator may be located in any location as desired.

The BFM 240 of the uVC 220 is configured to communicate with the programs and algorithms located in the DUT 270. An I/O data connection is created between the verification environment and the DUT such that the DUT is used to perform at least a portion of the verification of the design. Instead of generating verification programs, verification stimuli may be generated by the generator 230. For example, verification stimuli may provide instructions for the verification program to provide test vectors to the DUT. In some embodiment, the verification stimuli are commands sent by the uVC 220 to the emulator where verification programs are generated in the emulator environment instead of at the workstation. In other embodiments, these stimuli may be sent to the DUT where the CPU, memory and other components of the DUT are used to generate the verification processes called upon by the stimuli. These verification processes are then sent to the peripheral BFM 283, which may call and/or be combined with information such as images stored in the data memory 295 to be sent into the DUT for verification. In other words, process intensive operations are being performed in the emulator; thereby, avoiding the bandwidth limitations of communication between the verification environment and the emulator. The frequency and amount of information being transmitted between the verification environment and emulator is less because the stimuli takes less bandwidth and does not need to be transmitted as often compared to verification tests.

The programs and algorithms 265 may be stored in the memory of the DUT 270. The stimuli from the BFM 240 are transmitted to the memory where verification test are generated using the stimuli from the uVC 220. In some embodiments, the majority of the generating and processing of the verification tests are done by the CPU and other components of the DUT. The resulting verification test is sent to the peripheral BFM. In other embodiments, the verification test is sent to the bus BFM 286 or any other BFM 280 as required to perform the desired verification test. The BFM 283 and BFM 286 are connected to an interface layer 290 in order to communicate with data memory 295. The interface layer 290 is a layer of the emulator that allows the information in the data memory to be communicated to the DUT. In some embodiments, during verification testing, additional information such as testing data patterns or images may be provided by the information stored in the data memory 295 to the DUT via the interface layer 290. In other embodiments, the verification test with the testing information from the data memory 295 may then be sent to the DUT for verification testing via the interface layer 290.

Figure 6:
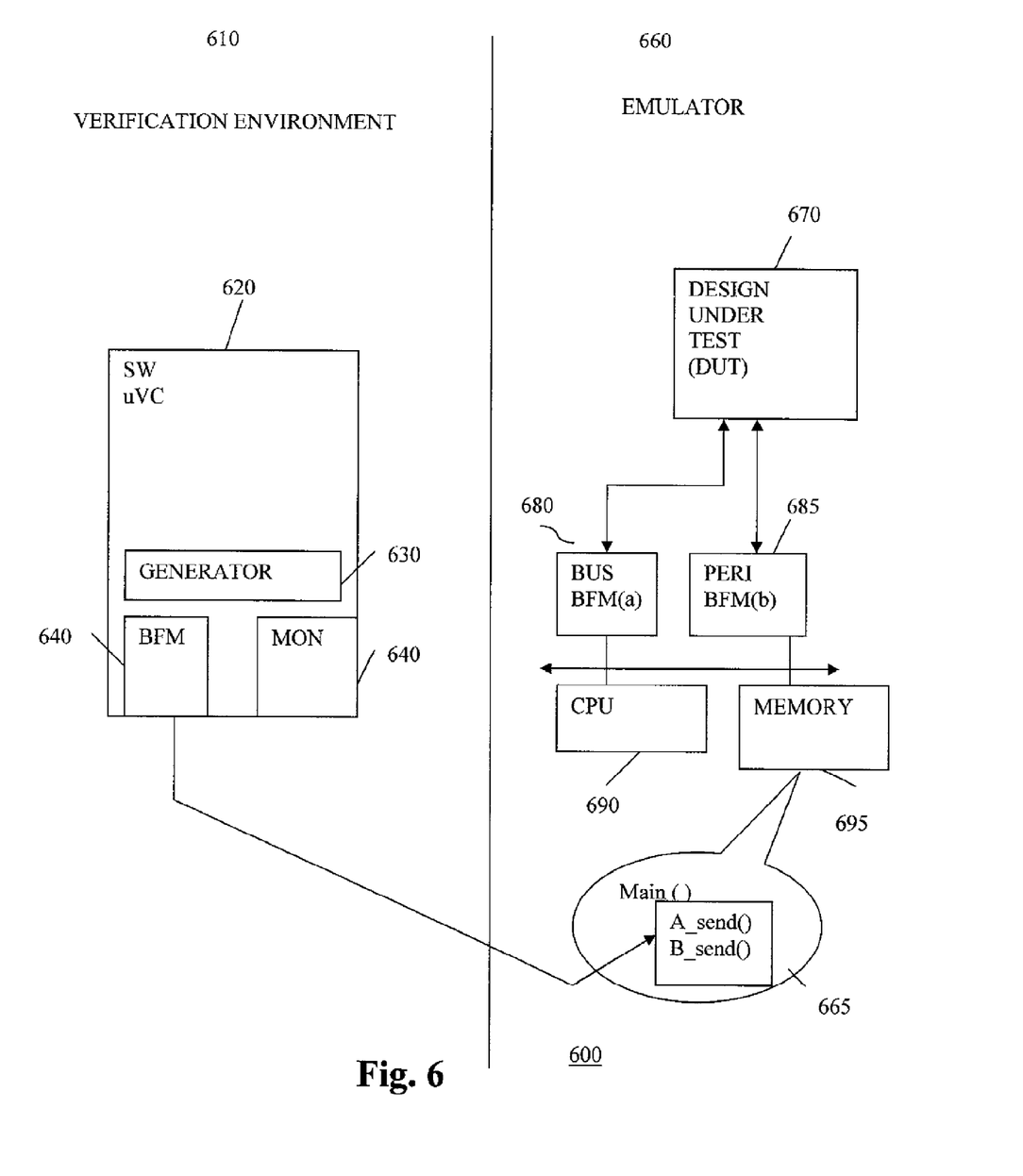
FIG. 6 illustrates a diagram of a communication between a verification environment and an emulator according to another embodiment of the invention.

FIG. 6 illustrates another embodiment where the strategy includes communicating with the embedded software in the emulator that is located outside of the DUT. For example, this embodiment may include a diagram 600 of a communication between a verification environment 610 and an emulator 660. Dedicated memory 695 and CPU 690 may be utilized by the emulator 660 to perform verification test.

The communication strategy 600 includes the verification environment 610 and the emulator 660. The verification environment 610 includes an uVC 620, which includes a generator 630, BFM 640, monitor 650. The emulator 660 includes a DUT 670, a first peripheral BFM and a second peripheral BFM 685, CPU 690, memory 695 and embedded software 665.

In one embodiment, the uVC 620 functions as the interface for access to the emulator 660. The generator 630 of the uVC 620 generates stimuli for the embedded software. In some embodiments, the stimuli are simple commands for instructing the embedded software to generate verification vectors and/or other tests. The BFM 640 formats the stimuli in the proper format and protocol for communicating with the embedded software 665. The embedded software 665, which may be located in dedicated memory 695, processes the stimuli using the assistance of the dedicated CPU 690. In some embodiments, a stimulus for sending a verification test to the first peripheral BFM 680 is sent to the embedded software 665. After the CPU 695 generates the verification tests, the first peripheral BFM 680 properly formats the test signal in the proper protocol and is provided to the DUT 670. In other embodiments, a stimulus for sending a verification test to the second peripheral BFM 685 is sent to the embedded software 665. After the CPU 695 generates the verification tests, the second peripheral BFM 685 properly formats the test signal in the proper protocol and is then provided to the DUT 670.

In some embodiments, verification test information, such as interrupts, may be observed and recorded by the monitor 650.

In some embodiments, the monitor may be monitoring a general-purpose input/output (GPIO) BFM. The information monitored at the GPIO BFM may be interrupts and other verification information that passes through this BFM. In some embodiments, if the verification is being performed to test the Ethernet MAC, the BFM may be an Ethernet BFM. The packets transmitted to and from the DUT may be Ethernet packets. In some embodiments, the BFM may be an universal serial bus (USB) BFM. USB protocol will be used for this situation. Other formats and protocols of BFM's may be used to ensure compatibility of the test signals.

In other embodiments, the DUT may be a cell phone design. Blocks in the DUT may include designs for the camera, modulator, demodulator, etc. The stimuli may cause the embedded software to generate a signal to perform verification testing on the simulated design of possible real world signals. A design, like a cell phone, may include a large number of I/O buses. In some embodiments, multiple processors may be used. The plurality of processors may be connected in parallel and/or in series.

The embodiments may be used for any type of design activities, including hardware design, software design, and designs including both hardware and software such as hardware/software co-design activities. For example, some embodiments of the invention may be applied to the design of embedded software and systems, which includes graphical processors, central processing units, computers, as well as any other systems that include embedded software.

Figure 7:
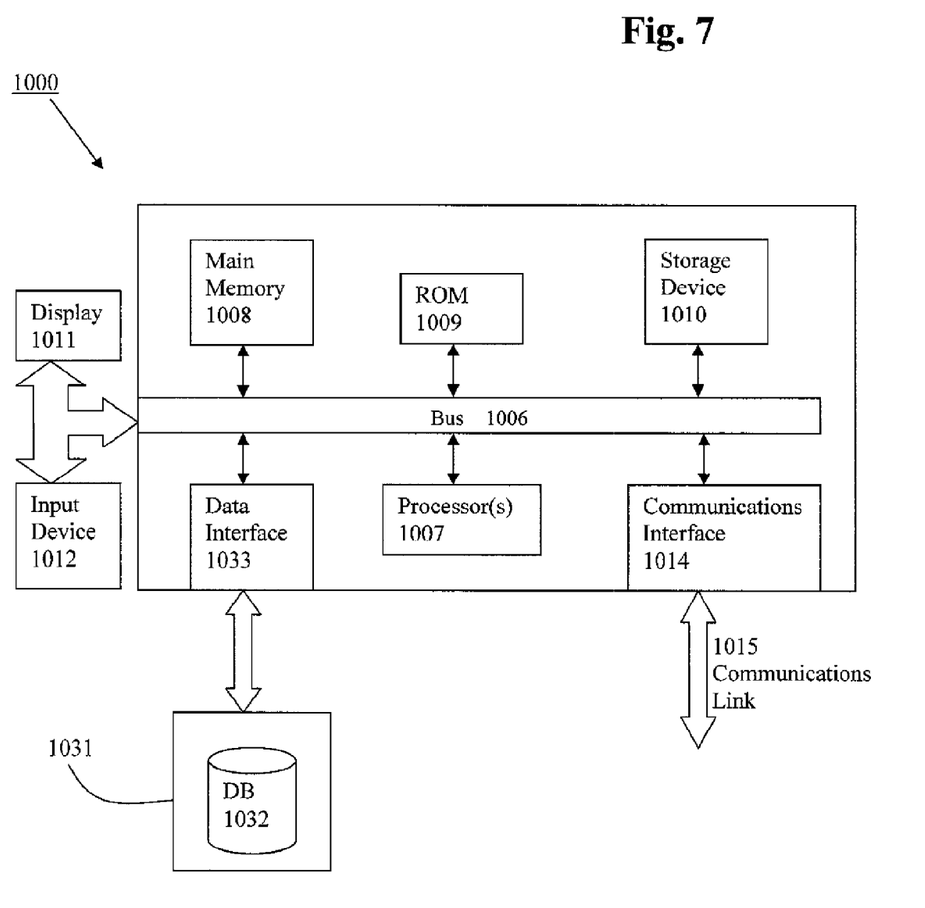
FIG. 7 depicts a computerized system on which a method for interfacing verification environment and the emulator can be implemented.

The execution of the sequences of instructions required to practice the embodiments may be performed by a computer system 1000 as shown in FIG. 7. In an embodiment, execution of the sequences of instructions is performed by a single computer system 1000. According to other embodiments, two or more computer systems 1000 coupled by a communication link 1015 may perform the sequence of instructions in coordination with one another. Although a description of only one computer system 1000 will be presented below, however, it should be understood that any number of computer systems 1000 may be employed to practice the embodiments.

FIG. 7 depicts a computerized system on which a method for verification of the DUT based on using the direct interface between the verification environment and emulator can be implemented. The execution of the sequences of instructions required to practice the embodiments may be performed by a computer system 1000 as shown in FIG. 7. In an embodiment, execution of the sequences of instructions is performed by a single computer system 1000. According to other embodiments, two or more computer systems 1000 coupled by a communication link 1015 may perform the sequence of instructions in coordination with one another. Although a description of only one computer system 1000 will be presented below, however, it should be understood that any number of computer systems 1000 may be employed to practice the embodiments.

A computer system 1000 according to an embodiment will now be described with reference to FIG. 7, which is a block diagram of the functional components of a computer system 1000. As used herein, the term computer system 1000 is broadly used to describe any computing device that can store and independently run one or more programs.

The computer system 1000 includes a bus 1006 or other communication mechanism for communicating instructions, messages and data, collectively, information, and one or more processors 1007 coupled with the bus 1006 for processing information. Computer system 1000 also includes a main memory 1008, such as a random access memory (RAM) or other dynamic storage device, coupled to the bus 1006 for storing dynamic data and instructions to be executed by the processor(s) 1007. The main memory 1008 also may be used for storing temporary data, i.e., variables, or other intermediate information during execution of instructions by the processor(s) 1007.

The computer system 1000 may further include a read only memory (ROM) 1009 or other static storage device coupled to the bus 1006 for storing static data and instructions for the processor(s) 1007. A storage device 1010, such as a magnetic disk or optical disk, may also be provided and coupled to the bus 1006 for storing data and instructions for the processor(s) 1007.

The computer system 1000 may be coupled via the bus 1006 to a display device 1011, such as, but not limited to, a cathode ray tube (CRT), for displaying information to a user. An input device 1012, e.g., alphanumeric and other keys, is coupled to the bus 1006 for communicating information and command selections to the processor(s) 1007.

Each computer system 1000 may include a communication interface 1014 coupled to the bus 1006. The communication interface 1014 provides two-way communication between computer systems 1000. The communication interface 1014 of a respective computer system 1000 transmits and receives electrical, electromagnetic or optical signals, which include data streams representing various types of signal information, e.g., instructions, messages and data. A communication link 1015 links one computer system 1000 with another computer system 1000. For example, the communication link 1015 may be a LAN, in which case the communication interface 1014 may be a LAN card, or the communication link 1015 may be a PSTN, in which case the communication interface 1014 may be an integrated services digital network (ISDN) card or a modem, or the communication link 1015 may be the Internet, in which case the communication interface 1014 may be a dial-up, cable or wireless modem.

A computer system 1000 may transmit and receive messages, data, and instructions, including program (i.e., application or code) through its respective communication link 1015 and communication interface 1014, Received program code may be executed by the respective processor(s) 1007 as it is received, and/or stored in the storage device 1010, or other associated non-volatile media, for later execution.

In an embodiment, the computer system 1000 operates in conjunction with a data storage system 1031, e.g., a data storage system 1031 that contains a database 1032 that is readily accessible by the computer system 1000. The computer system 1000 communicates with the data storage system 1031 through a data interface 1033. A data interface 1033, which is coupled to the bus 1006, transmits and receives electrical, electromagnetic or optical signals that include data streams representing various types of signal information, e.g., instructions, messages and data. In other embodiments, the functions of the data interface 1033 may be performed by the communication interface 1014.

According to one embodiment, an individual computer system 1000 performs specific operations by their respective processor(s) 1007 executing one or more sequences of one or more instructions contained in the main memory 1008. Such instructions may be read into the main memory 1008 from another computer-usable medium, such as the ROM 1009 or the storage device 1010. Execution of the sequences of instructions contained in the main memory 1008 causes the processor(s) 1007 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1007. Such a medium may take many forms, including, but not limited to, non-volatile and volatile. Non-volatile media, i.e., media that can retain information in the absence of power, includes the ROM 1009, CD ROM, magnetic tape, and magnetic discs. Volatile media, i.e., media that cannot retain information in the absence of power, includes the main memory 1008.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

What is claimed is:

1. A method for verifying a design under test comprising:
   providing an interface to communicate with a test software running on an emulator;
   communicating a stimulus from a verification environment to control the test software on the emulator, in which the test software generates a verification test in the emulator with resources within the emulator; and
   verifying the design under test.

2. The method of claim 1, in which the stimulus comprises video frames or test signal information.

3. The method of claim 1, in which a multi-channel sequence comprises the stimulus.

4. The method of claim 1, further comprising calling a function to generate the verification test from within the test software.

5. The method of claim 1, wherein the interface comprises a verification component capable of monitoring verification results.

6. The method of claim 1, further comprising providing a result of the verifying to a verification component.

7. The method of claim 1, further comprising instantiating a processor.

8. The method of claim 7, wherein the design under test comprises the instantiated processor.

9. The method of claim 7, wherein the emulator comprises the instantiated processor, which is not within the design under test.

10. A computer program product embodied on a non-transitory computer readable medium, the computer readable medium having stored thereon a sequence of instructions which, when executed by a processor causes the processor to execute a method for verifying a design under test, the method comprising:
    providing an interface to communicate with a test software running on an emulator;
    communicating a stimulus from a verification environment to control the test software on the emulator, in which the test software generates a verification test in the emulator with resources within the emulator; and
    verifying the design under test.

11. The product of claim 10, wherein the interface comprises a verification component capable of monitoring verification results.

12. The product of claim 10, further comprising providing the verification results to a verification component.

13. An apparatus for verifying a design under test comprising:
    a processor programmed for:
    providing an interface to communicate with a test software running on an emulator;
    communicating a stimulus from a verification environment to control the test software on the emulator, in which the test software generates a verification test in the emulator with resources within the emulator; and
    verifying the design under test.

14. The system of claim 13, wherein the interface comprises a verification component capable of monitoring verification results.

15. The system of claim 13, further comprising providing the verification results to a verification component.

16. A system for accelerating verification of a design under test comprising:
    a verification portion comprising a software universal verification component for providing stimuli directly to an embedded software; and
    an emulator portion comprising the embedded software and a design under test, wherein the embedded software performs verification processes called upon by the stimuli, in which the embedded software generates a verification test in the emulator portion with resources within the emulator portion.

17. The system of claim 16, wherein the verification portion is located on a workstation.

18. The system of claim 16, wherein process intensive operations are performed at the emulator portion.

19. The system of claim 16, wherein the verification processes are sent to one or more peripheral bus functional models.

20. The system of claim 19, wherein the verification processes are combined with images stored in memory.

21. The system of claim 19, wherein the bus functional models is configured to transmit the stimuli for direct function calls inside the embedded software from the verification portion.

22. The system of claim 16, wherein the component controls and monitors data at the external interface of the design under test.

23. The system of claim 22, wherein the data is pre-generated and stored in a subsystem.

24. The system of claim 16, wherein the component is provided for a user to interface with the embedded software to allow for the calling and coordinating of activities in the design under test from the verification portion.

* * * * *